Patented Oct. 16, 1934

1,976,798

UNITED STATES PATENT OFFICE 1,976,798

RUBBER BONDED ABRASIVE ARTICLE

Charles S. Nelson, Niagara Falls, N. Y., and Garnet H. Porter, Pittsfield, Mass., assignors to The Carborundum Company, Niagara Falls, N. Y., a corporation of Pennsylvania No Drawing. Application July 27, 1932, Serial No. 625,202. In Canada August 1, 1930

13 Claims. (Cl. 51—278)

This application is a continuation in part of our copending application, Serial No. 384,520, filed August 8, 1929.

This invention relates to the manufacture of abrasive articles, and more particularly to a product suitable for use in the manufacture of abrasive articles wherein the abrasive particles are bonded by vulcanized rubber.

It has been common practice to incorporate abrasive grains in rubber sheets by a milling process according to which the rubber bond is first compounded by repeatedly passing the rubber and the compounding materials between a pair of revolving rolls, and then milling the abrasive grains into the rubber compound by repeatedly passing the abrasive grain and rubber compound between the same or similar rolls. It is obvious that such a process is not well-adapted to distribute the abrasive grains uniformly throughout the rubber and that any milling process of this kind tends to crush the abrasive grains so that the size of the grain in the completed article will be different from that first introduced. Abrasive wheels, for instance, produced by this process are very dense, and develop, in their operation, a very large amount of heat because of the friction between the rubber bond and the article being abraded. This heat produces objectionable odors from the rubber and tends to cause the abrasive grains to break out as whole grains. The efficiency of grinding is thereby reduced.

Another process used heretofore comprises the use of rubber that has been dissolved in some organic solvent, together with fillers, vulcanizers and abrasive grain, and molding the article from a wet mix. This type of process tends to produce greater uniformity in the article than the milling process, but has many disadvantages. During the process of curing, difficulty arises from the development of bubbles, and from the slumping of the molded article after it is transferred from the mold to the vulcanizing oven. If the mixture is not molded when it is quite wet, it becomes very viscous and can be molded only with difficulty.

According to the present invention, there is provided a distributable mix comprised of abrasive grain and rubber together with other ingredients which, according to one modification, can be stored and used from time to time as it is needed. This mixture of abrasive grain and bond is substantially dry to the touch and can be worked about in the mold without difficulty so that an article of uniform distribution of grain, bond and pore space can be secured. The abrasive particles are retained more tenaciously in the finished article than are the abrasive particles in a wheel produced in accordance with either of the known methods above described.

According to the present invention, the sheet rubber is dispersed in any suitable manner. This dispersion of rubber can be kept in stock to be used from time to time as required. In the dispersion of rubber there is included a protective colloid, such as a colloidal clay, casein, etc., as well as any known or preferred preservative, as for instance formaldehyde or borax, which serves to prevent the mass from coagulating. Other materials which are used are magnesia (magnesium oxide), lead acetate, abrasive grain, water, and the usual compounding fillers such as carbon black, sulphur, zinc oxide, etc.

In carrying out our invention, we first wet the abrasive grains with a solution of a mild coagulant such as lead acetate in water and then stir into the thus wetted grains a previously prepared mixture of an artificial rubber dispersion and sulphur. The lead acetate serves to thicken the rubber-sulphur dispersion and increases the smearing action of the rubber on the grain. It also promotes adhesion of the rubber to the grain in the dried, unvulcanized mix.

After these constituents have been mixed as described, for several minutes, magnesia is added after which the materials are again mixed for about one minute. The magnesia serves to reduce the time required to effect proper vulcanization and, incidentally, it neutralizes or renders slightly alkaline the mixture and tends to prevent "spotting", by which is meant that the article is spotted with yellow patches apparently caused by the action of the acid character of the coagulant on the rubber. At these spots the rubber is weakened to an extent that the abrasive article is "soft" in these local areas and thereby made non-uniform in grinding action. The addition of a basic oxide such as magnesia overcomes this difficulty.

This mixture is then dried until it contains from 5% to 10% moisture, depending upon the mix formula, after which it is disintegrated. If the mixture is too wet, the mass of grain and bond can not be broken up or granulated properly. If the mixture is too dry, it tends to become lumpy, and this is not desirable in the further process of molding. One way of breaking up or disintegrating the dried mass comprises the use of a simple mechanical device in which the conglomeration of rubber, abrasive grains, etc., is subjected to the action of a rotating flail in the form of a shaft provided with a plurality of pins extending out from the shaft at right angles to it and arranged to pass between a fixed row of pins within a container. The movement of the pins on a shaft between the pins of the fixed row serves to break up the conglomeration into small clusters of grain and rubber. It is, however, usually more convenient to disintegrate the mix at this stage, at which it is of about the consistency of wet sawdust, by screening through a relatively coarse screen, a mix of #12 grit would for example, be screened through a #4 mesh screen.

We have found that the greatest uniformity is obtained when the conglomeration is broken up at the time when the mixture has a critical moisture content, which content depends upon the proportion of rubber in the mixture and the kind and amount of fillers used. Fillers which are relatively water absorptive, for example, tend to increase the value of the critical moisture content. The critical moisture content of any grain mixture is, however, readily determinable by trial. In mixtures containing only abrasive grain, rubber, sulphur, and a small percentage of a filler such as calcined magnesia, as most abrasive mixtures do, the critical moisture is of the order of from 5% to 10% of the mix. A more rational way of expressing the value is, however, to base the moisture content on the rubber content. Expressed in this way, the critical moisture is within the range of 60% to 140% of the rubber; it is ordinarily within the range of 90% to 110% and is usually about 100% which corresponds to about 7% of the total mix in the particular case under discussion.

According to one modification of the invention, the fragments obtained by breaking up the conglomeration are dried until the moisture content is in equilibrium with the normal surrounding atmosphere. The consistency of this completely dried product depends upon the composition of the mix. Where "drying" fillers such as carbon black are included, it is an easily workable mass of individual rubber coated grains and small clusters of grain and rubber, while if the mix contains only a small amount of a filler such as magnesia, it tends to form in aggregates which are, however, readily reduced to individual grains by passing through a disintegrator, as previously described. Such mixes have the very unique property of being more readily disintegrated when warm than if they are cold. The usual rubber mix becomes tacky when heated which would lead one to expect that abrasive mixes should be cooled before disintegrating. However, we have found the contrary to be true and when handling mixes of their type, we actually increase the temperature of the drying oven to 160° to 180° Fahr. shortly before disintegrating as we find that this facilitates this step. Regardless of the composition of the mix, however, the rubber is in close adherence to the abrasive grains, but the individual grains and the grain clusters remain for the large part isolated from one another after the mix has been disintegrated. The grains and grain clusters do not coagulate to form a heavy viscous mass, but remain in a condition whereby they adhere only slightly, and the individual grains and the grain clusters can be easily separated out of the mass. At the same time, the rubber adheres very closely to the surface of the individual grains, in marked contrast to the want of adherence between the rubber and the grain that exists in abrasive articles wherein the abrasive is milled into the rubber sheets or wherein latex is used as the source of the rubber bond. The adherence of the rubber and the abrasive particles obtained by the present invention prevents segregation of the mix constituents while the composition is in the granular stage.

The dried and substantially granulated mix can be stored until needed or sold to other abrasive manufacturers, since it is readily transportable and there is no appreciable segregation of the grain by gravity while the material is in storage, or is being handled or processed.

When it is desired to make an abrasive article in accordance with this modification, the dried material is preferably heated to about 180° Fahr. and then placed in a mold. Being dry and being formed of coated grains and grain clusters between which there is little coherence, particularly when heated, the composite granules and particles are free to roll over one another so that the mold can be evenly and uniformly filled, and any excess can be struck off from the top of the mold as though the mold were filled with dry abrasive grains alone. This property of being adapted to a uniform filling is of great importance since any non-uniformity in the distribution of the mix reduces the value of the article. An abrasive wheel is operated at relatively high speeds and therefore any irregularity in the density of the wheel throws it out of balance with a consequent roughness of operation. Furthermore, if the mix is not uniformly distributed, the article will contain spots, some of which will be harder, and others, softer than is intended with consequent irregularities in the grinding action of the article.

The material in the mold is then heated to approximately 287° Fahr., whereby the plasticity of the bond is developed, and then formed into the desired shape by any suitable method. After vulcanization, the article is dressed according to the requirements of the market.

This modification of the invention possesses many advantages in that there is provided, as an intermediate product of manufacture, a mix of rubber and abrasive particles that is adapted to dry molding processes, as distinguished from the wet molded processes heretofore practiced where rubber dispersions have been used as a bond. This intermediate product of manufacture can be stored indefinitely, removed from storage when necessary, and worked in the dry state in the mold while forming the abrasive articles. The product may be poured into a mold and tamped. When heated to about 180° Fahr., any excess material in the mold can be struck off, and the struck off portion may be returned to the mass in storage without appreciable loss. The abrasive article is relatively open and porous and is therefore comparatively cool cutting. The abrasive particles are more firmly retained in the abrasive article and the grain distribution is more uniform, so that in many respects the resulting article is superior to rubber bonded articles heretofore made.

The material can be easily dried in a few hours due to the open structure of the conglomerate mass which allows for a relatively free circulation of air therethrough and thereabout. The rubber is spread over the surface of the granules, and exposes a considerable area to the circulation of the air by means of which the drying of the rubber is accelerated. By reason of the fact that the material is put into the molds in the form of a substantially dry substance, residual water which is conductive to disruption of the article in the process of forming articles from mixing is not present, so that disruption from this cause does not occur.

Instead of completing the drying of the disintegrated or screened mix as just described, we sometimes find it desirable to mold the mixture which has been dried to the critical moisture content and disintegrated by pressing it into a blank of substantially the desired shape and size, removing from the mold, completing the drying of the formed article, and then completing the consolidation; for example, by replacing the blank in its mold and applying pressure thereto.

This modification of our process has a number of advantages over the old art and, under certain circumstances, over the other modification of our invention first described. The mixture which has been disintegrated at the critical moisture content is readily distributable and yet is sufficiently dry so that it will retain its form when pressed, whereas the mix when first made is too wet to hold a shape without some sort of support. Although it is necessary, in order to prevent bloating, to remove substantially all of the volatile liquids from abrasive mixes before they are vulcanized, this method is very satisfactory where an article is to be made directly from a mix, there being no suitable dried mix in storage. The step of disintegrating and heating the dried mix to make it more mobile is eliminated and, at the same time, the method does not involve the use of molds for extended periods, as is required if the mix is molded directly from the original wet form.

Another advantage of our process, applicable to either modification, resides in the fact that it is possible to use up all the mix in the finished article, a fact not true of previously known processes. Heretofore it has been necessary to prepare an excess of mix because in stamping an article from a sheet, it is impossible to roll the sheet to the exact size. This excess mix, which may amount to as much as 100 pounds in the case of a large wheel, must then be kept until another article of this particular composition is to be made. This is, at times, a decided disadvantage, particularly in the case of mixes not in common use. Our process avoids this entirely since only enough mix to fill the requirement at any given time need be made.

The improved abrasive mixture of our invention apparently is made possible by reason of two facts that we have discovered. In the first place, we have found that an abrasive mixture made of abrasive grains and an artificial dispersion of rubber can be disintegrated into individual grains and small clusters of grains attached to the rubber bond, if the mixture is first dried to a critical moisture content, the magnitude of which we have determined to be ordinarily about 100% of the rubber content. In the second place, we have discovered that if the coagulant, a specific example being lead acetate, is first added to the abrasive grain and the dispersion is added later, the adhesion between the grain and the rubber of the dried and partially dried mix is increased. Although it is possible to disintegrate a mix at the critical moisture content even though the step of wetting the grain with the coagulant is omitted, in such cases there is some tendency for the grain to become detached from the rubber and this step is therefore an important, though not an essential feature of the invention.

As an example of the relative proportions of the materials, the following is given as one illustration, but it is to be understood that the invention is not confined to this particular example:

92 parts of abrasive grain of 16 grit;
8 parts of rubber determined on a dry basis;
4 parts of sulphur;

an amount of lead acetate equal to 1 per cent by weight of the rubber present, but added with water in the form of a ten per cent solution; and an amount of magnesium oxide equal to 1 per cent of the total mixture.

It is ordinarily desirable to disintegrate the mix after drying is completed in order to further break up aggregates which tend to form after the screening and the final step of drying. It is also sometimes desirable to further dry for an hour or so after the final disintegration in order to remove traces of moisture exposed by the disintegration. This step is useful particularly when the mix is to be stored for any length of time.

The following example illustrates another type of mix which does not ordinarily agglomerate appreciably after it is dried following disintegration at the critical moisture content which, in this case, is about 10% of the total mix (100% of the rubber):—

80 parts of abrasive grain, #120 grit;
10 parts of rubber determined on a dry basis;
5 parts of sulphur;
2 parts of carbon black;
2 parts of rouge;
1 part of magnesia made into a paste with 1 part of water;
0.1 part of lead acetate added in the form of a 10 per cent solution in water.

The finished articles made by either modification of our invention have been found to be very satisfactory in regard to cutting qualities and the strength of the bond. Tensile strengths as high as from 1200 to 2500 pounds per square inch have been obtained, depending upon the grit size, the composition of the mix, the pressures used, and the type of cure.

While the particular character of the abrasive grain has not been specified, silicon carbide has been found satisfactory. Crushed fused alumina, garnet, and other artificial and natural abrasives may be used. Similarly, while lead acetate has been cited as the coagulant, other mildly acid salts such as zinc or aluminum sulphates may be substituted therefor, this type of material being referred to broadly in the claims as "a coagulant."

The terms "artificial dispersion of rubber", "dispersion of previously coagulated rubber" and "aqueous dispersion of previously coagulated rubber", as used in this specification and the appended claims are interpreted to mean the manufactured product made from coagulated rubber as distinguished from latex, which is a product of nature, and in which the rubber has not been coagulated.

While we have given specific examples of our invention, the invention is not confined thereto but may be otherwise practiced since various changes and modifications may be made therein without departing from the scope of the invention as set forth in the following claims.

We claim:—

1. The process of preparing abrasive grains and rubber bond for the manufacture of abrasive articles, which comprises mixing a dispersion of previously-coagulated rubber with abrasive grains and sulphur, drying the mixture to such a degree that it becomes distintegratable without substantial separation of grain from the rubber, and thereafter disintegrating said dried mixture.

2. A new article of manufacture comprising a distributable mixture of abrasive granules and vulcanizable rubber compound, said mixture being in the form of individual granules or clusters of a few granules and said rubber compound containing less than one and one half times as much water as rubber and being substantially uniformly distributed through the mixture and substantially all attached to said granules, the rubber of said compound being derived from a dispersion of previously-coagulated rubber.

3. A new article of manufacture comprising a distributable mixture of abrasive granules and vulcanizable rubber compound, said mixture being in the form of individual granules or clusters of a few granules and said rubber compound containing approximately equal quantities of water and rubber and being substantially uniformly distributed through the mixture and substantially all attached to said granules, the rubber of said compound being derived from a dispersion of previously-coagulated rubber.

4. A new article of manufacture comprising a distributable mixture of abrasive granules and a substantially dry vulcanizable rubber compound, said mixture being in the form of individual granules or clusters of a few granules and said rubber compound being substantially and uniformly distributed through the mixture and substantially all attached to said granules, the rubber of said compound being derived from a dispersion of previously-coagulated rubber.

5. In the process of manufacturing rubber bonded abrasive articles, the steps which comprise mixing abrasive grains with an aqueous dispersion of previously-coagulated rubber and vulcanizing agent, drying the mixture until the moisture content is between one half and one and one half times the rubber content, disintegrating the mixture into a mass of individual detached rubber coated grains and small clusters of rubber coated grains and which tend to remain detached; subsequently compacting the coated grains and clusters in a mold and curing the rubber to form a coherent molded article.

6. In the process of manufacturing rubber bonded abrasive articles, the steps which comprise mixing abrasive grains with an aqueous dispersion of previously-coagulated rubber, and vulcanizing agent, drying the mixture until the moisture content is approximately equal to the rubber content, disintegrating the mixture into a mass of individual, detached rubber coated grains and small clusters of rubber coated grains and which tend to remain detached, subsequently compacting the coated grains and clusters in a mold and curing the rubber to form a coherent molded article.

7. The method of manufacturing rubber bonded abrasive articles which comprises making a mixture of abrasive grains, an artificial dispersion of rubber in water and a vulcanizing agent, drying the mixture to its critical moisture content, whereby low cohesion between the bond coated grains is effected and disintegrating it into individual, detached rubber coated grains and small clusters of rubber coated grains, forming an article from the mix and drying it and vulcanizing it.

8. The method of manufacturing rubber bonded abrasive articles which comprises making a mixture of abrasive grains, an artificial dispersion of rubber in water and a vulcanizing agent, drying the mixture to its critical moisture content, whereby low cohesion between the bond coated grains is effected and disintegrating it into individual, detached rubber coated grains and small clusters of rubber coated grains, drying the mix until the water is substantially all removed, forming an article from the dried mix and heating it to vulcanize the rubber.

9. The steps in the process of making a product for use in the manufacture of rubber bonded abrasives which comprise moistening the abrasive grain with a solution of a coagulant and mixing the moistened grain with a dispersion of previously coagulated rubber and vulcanizing agent, drying the mixture to its critical moisture content, whereby low cohesion between the bond coated grains is effected and disintegrating it into individual, detached rubber coated grains and small clusters of rubber coated grains, drying the mix until the water is substantially all removed, forming an article from the dried mix and heating it to vulcanize the rubber.

10. The steps in the process of making a product for use in the manufacture of rubber bonded abrasives which comprise moistening abrasive grain with a solution of lead acetate, mixing the moistened grain with a dispersion of previously coagulated rubber and a vulcanizing agent, drying the mixture until the moisture content is approximately equal to the rubber content, whereby low cohesion between the bond coated grains is effected disintegrating the mixture, and removing substantially all the water.

11. The process of preparing abrasive grains and rubber bond for the manufacture of abrasive articles which comprises forming a mixture containing abrasive grains, a dispersion of previously coagulated rubber and a vulcanizing agent, drying the mixture to such a degree that it becomes disintegratable without substantial separation of grain from the rubber, and thereafter disintegrating said dried mixture.

12. In the manufacture of rubber bonded abrasive articles, the steps which comprise forming a mixture containing abrasive grains, a vulcanizing agent, and a dispersion of previously coagulated rubber, bringing said mixture into a disintegratable condition, and thereafter disintegrating it into a loose distributable mass of readily separable rubber coated grains or small clusters of grain.

13. In the method of manufacturing rubber bonded abrasive articles, the steps which comprise preparing a disintegratable mixture containing abrasive grains, a vulcanizing agent and rubber applied to the abrasive grains as a dispersion of previously coagulated rubber, and thereafter disintegrating said mixture into a loose distributable mass of readily separable rubber coated grains or small clusters of grain.

CHARLES S. NELSON.
GARNET H. PORTER.